Oct. 18, 1966   W. A. BEATON ET AL   3,280,320
PHOTOGRAPHIC LIGHTING DEVICE
Filed March 27, 1964
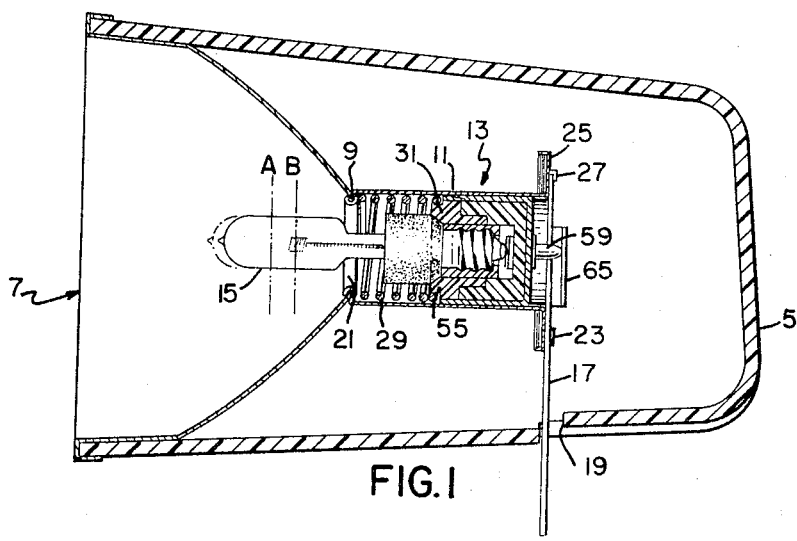
FIG.1
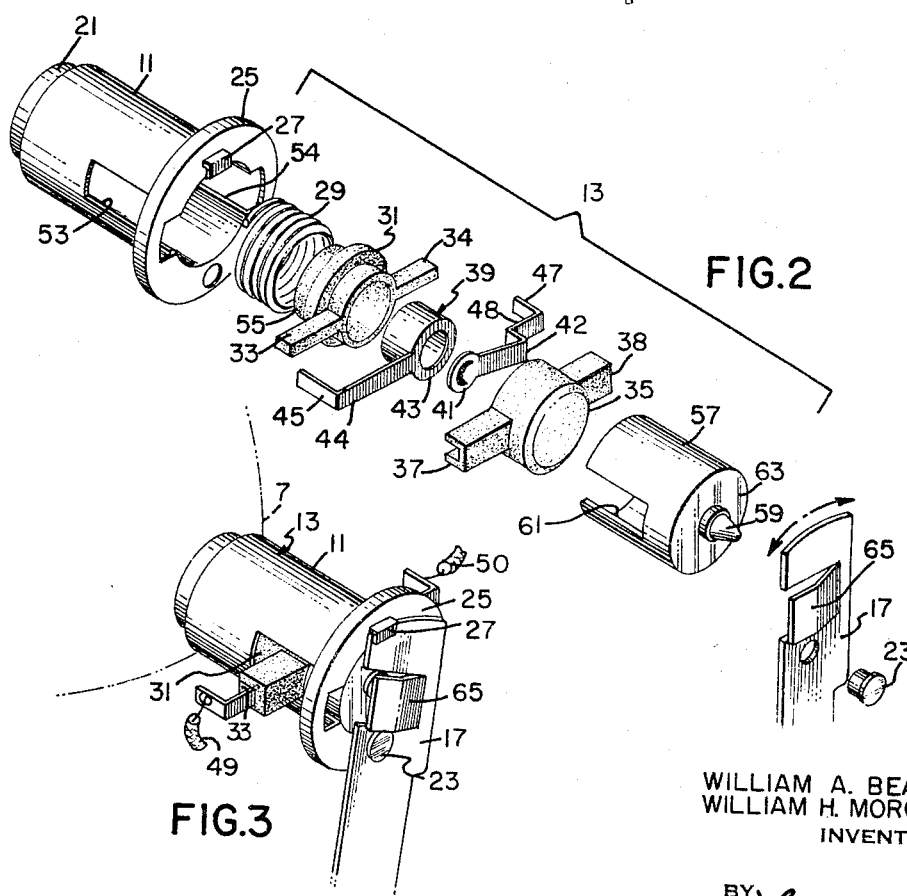
FIG.2
FIG.3
WILLIAM A. BEATON
WILLIAM H. MORGAN JR.
INVENTORS
BY Lawrence Burns
ATTORNEY

3,280,320
PHOTOGRAPHIC LIGHTING DEVICE

William A. Beaton, Lynn, and William H. Morgan, Jr., Georgetown, Mass., assignors to Sylvania Electric Products Inc., a corporation of Delaware
Filed Mar. 27, 1964, Ser. No. 355,225
2 Claims. (Cl. 240—1.3)

This invention relates to lighting devices and more particularly to lighting for photographic purposes. More specifically the invention concerns an adjustable lamp and mounting in which the lamp can be moved relative to a surrounding reflector to produce various light patterns necessary for photography. The main two light beam positions achieved by this lighting device are dependent on the extent of movement of the lamp within the reflector. When the lamp is moved forward to its limit, a "flood" or wide area light pattern is developed, while if the lamp is moved to its innermost position in the reflector, a light pattern of a more condensed version or what is called a "zoom" is produced.

The flood position or large light pattern is used primarily for wide angle photography and the zoom position for single subject or details. By positioning the lamp at different stations between the flood and zoom positions, many different light patterns can be produced. These variations of light patterns can be used for a myriad of special effects.

An object of this invention is to provide a lighting device for producing varied light patterns for use with photographic equipment.

Another object of this invention is to provide a mechanism for moving a lamp along a horizontal axis of the reflector.

These and other objects, features and advantages of the invention will be apparent from the following specification when taken in conjunction with the accompanying drawings in which:

FIGURE 1 is an elevational cross-sectional view of the invention showing the mechanical means for moving a lamp in a reflector.

FIGURE 2 is an enlarged exploded view of the mechanism as viewed in FIGURE 1.

FIGURE 3 is an enlarged perspective view of the parts shown in FIGURE 2 in an assembled position.

Referring to FIGURE 1, the lighting device of this invention comprises a cup-like, tapered housing 5 which can be attached to a suitable holder or handle (not shown in the drawings). The larger front part of the housing is open to receive an essentially parabolic reflector 7 that is set into the cavity of the housing 5. An aperture 9 is located at the rear apex on the reflector and receives a cylindrical metal sleeve 11, which in turn holds within its confines a lamp adjusting mechanism 13. This mechanism will be fully described below, but briefly the purpose of this mechanism is to provide a means for moving a lamp 15 between two focal positions in the reflector which are designated as "A" and "B" in FIGURE 1. The "A" position is the flood and will produce an expansive light pattern while the "B" is the zoom which will give a condensed light pattern and is usable with a conventional zoom lens of a camera. A positioning arm 17 located at the rear of the cylindrical sleeve extends through a slot 19 in the bottom part of a recessed area of the housing 5, and protrudes below the housing so that the positioning arm can be moved from the outside. By moving the positioning arm 17, the lamp 15, located within the reflector 7, can be positioned for the different light patterns. As mentioned above not only a flood or zoom can be produced but also varied light patterns can be established between these points.

Referring now to FIGURE 2, a more complete description of the adjustable lamp mechanism 13 will now be made. The cylindrical metal sleeve 11 is made to receive and hold the adjustable lamp mechanism which can be held and retained in the sleeve 11 by the positioning arm 17. Positioning arm 17 is pivotally mounted by a rivet 23 to an enlarged circular collar 25 located at the rear of the sleeve 11.

A spring washer (not shown) or a similar item can be placed between the rivet 23 and the positioning arm 17 to add friction to arm 17 so that the pressure of spring 29 will not displace arm 17. The positioning arm 17 is guided and held during its travel by an ear 27 formed on the collar 25.

A spring 29 is fitted into sleeve 11, one end of which abuts against the reduction section 21 of sleeve 11, better viewed in FIGURE 1. A movable hollow insulated forward socket 31, having a stepped cross-section is provided with a pair of oppositely disposed rectangular-shaped ears 33 and 34 extending outwardly from the body. A mating rear insulated socket 35 also having oppositely disposed extensions 37 and 38 which are U-shaped to receive the ears 33 and 34 which depend from the mating forward socket 31. Located between the forward socket 31 and the rear socket 35 are two conductive parts; a lamp shell 39 and a lamp contact 41. The lamp shell 39 has a main hollow circular body 43 and an inner surface provided with a female lamp thread. The lamp shell 39 has an extending leg 44, but the length of which is more than the length of the ear 33 of the top socket 31. The distal end of leg 44 is bent at right angles to provide an electrical contact 45, the surface of which will be utilized for the attachment of an external electrical source, such as wire, as viewed in FIGURE 3. The main body of the lamp shell 43 is fitted into the hollow interior of the forward socket 31 and the leg portion 44 will rest against the rear surface of ear 33 of the forward socket 31. The lamp contact 41 also has a leg 42 extending from its button-like main body portion. This leg is bent at right angles to put the outer end 47 out and beyond the end of the ear 34 of the forward contact 31. The portion of leg 42 designated as 48, will bear against the rear surface of ear 34 of the forward contact 31. The rear ceramic socket 35 is then mated to the forward socket 31 to enclose the lamp shell 39 and the lamp contact 41 within the assembled ceramic sockets. The surfaces 45 and 47 of legs 44 and 42 are thereby held away from the socket body. Both of these surfaces 45 and 47 will be used as electrical contact points for external wires 49 and 50 as viewed in FIGURE 3.

The assembled ceramic socket consisting of the forward socket 31, lamp shell 39, lamp contact 41 and rear socket 35 is fitted into the sleeve 11. The rear collar 25 and part of the main cylindrical body of sleeve 11 is cut away to provide a pair of slots 53 and 54 for the insertion of the ceramic socket assembly into the sleeve 11. The laterally extending ears 33, 34, 37 and 38 holding legs 44 and 48 of the lamp shell and lamp contacts protrude out beyond the main body of the sleeve 11. As mentioned above, the top socket 31 has a forward circular ledge 55 disposed circumferentially thereabout that is capable of fitting into the inside core of the spring 29 thereby supporting the spring 29 for its movement within the cylinder 11.

An inner metal cover slide 57 is utilized to hold the insulated socket assembly intact, and to provide a slidable surface for these components. As viewed in FIGURE 1, the cover slide 57 encompasses the socket assembly and provides a metal to metal slidable arrangement with the inner wall of sleeve 11. Referring to FIGURE 2, the cover slide 57 is a cup-like cylindrical member, having a pair of diametrical opposed slots 61. Only one of these slots are shown in FIGURE 2. The slots 61 are cut to a size that will accommodate the ceramic extensions 33, 34, 37 and 38 of the socket assembly. The slide 57 has a bottom plate 63, provided with a cam button 59 centered on its exterior side. The slide 57 can be inserted into the barrel of the sleeve 11 thus covering the insulated socket assembly and holding it against the spring 29. With this spring arrangement, the slide 57 holding the socket is thereby spring-biased toward the rear opening of sleeve 11. The positioning arm 17 as mentioned above is then pivotally secured by rivet 23 to the collar 25 on sleeve 11 and is guided and held at its top edge by the guide ear 27. The positioning arm 17 also has a formed cam leaf 65 located midway between the top edge and the pivot rivet 23. This cam leaf 65 is bent in such a way that when the positioning arm 17 is moved in a clockwise direction, the cam button 59 fixed to the metal sleeve 57 follows the cam surface. The cam surface allows the socket assembly that is retained within the sleeve 11 to be spring biased to the rear by spring 29.

The adjustable lamp mechanism held within the sleeve 11, and retained therein by the positioning arm 17 is then secured to the aperture of the reflector 7. Various methods can be used to join the sleeve 11 to the reflector 7, but in this instance the reduced section 21 of the sleeve 11 is inserted into the aperture 9 of the reflector 7 and the reduced section 21 is then spun down over the edge of the reflector 7, thereby cinching the two components together. This will make a unitary structure of the assembled parts and this structure can then be readily inserted into the cavity of the housing 5 to complete the lamp assembly.

Referring now to the FIGURE 1, a single-ended lamp is screwed into the female shell 39. The lamp is a high efficiency lamp, preferably one filled with halogen gas in which tungsten migration and deposition from the heated filament on the glass surface is avoided. Thus, a lamp of this type has an almost uniform brightness during its entire life. The single-ended construction of the lamp is simple and sturdy allowing the lamp to be axially displaceable within the reflector. As mentioned above, with the movement of the positioning arm 17 the cam button 59 will ride on the surface of the cam leaf 65. This clockwise movement will release the spring-biased lamp and the associated assembly rearwardly thereby moving the lamp from "A" or flood position to the "B" or zoom position in the reflector. Reverse movement or counterclockwise movement of the positioning arm as viewed in FIGURE 3 will return the lamp to its forward "A" or flood position.

It is apparent that modifications and changes can be made within the spirit and scope of the instant invention but it is our intention, however, only to be limited by the appended claims.

What we claim is:

1. A lighting device comprising: a reflector; means forming an aperture within said reflector; a two piece movable socket comprising forward and rearward insulators; a lamp shell and a lamp contact disposed between said forward and rearward insulators; said socket disposed behind said reflector; a lamp held within said movable socket and extending through said aperture in said reflector; said movable socket having a forward circular ledge circumferentially disposed thereabout; a compression spring, the inner diameter of said spring fitting around said circular ledge of said movable socket whereby said socket is moved against the force of said compression spring.

2. A lighting device comprising: a reflector; means forming an aperture within said reflector; a movable socket disposed behind said reflector, and a forward and a rearward insulator, a lamp shell and a lamp contact disposed between said forward and rear insulators, said lamp shell and said lamp contact having legs, which extend outwardly from said movable socket; a lamp held within said movable socket and extending through said aperture in said reflector; means for moving said lamp and socket relative to said reflector wherby the light pattern of said lamp can be changed relative to such movement.

References Cited by the Examiner

UNITED STATES PATENTS

| | | | |
|---|---|---|---|
| 1,394,896 | 10/1921 | Halvorson | 240—44.2 XR |
| 1,578,930 | 3/1926 | Sklarek | 240—44.2 XR |
| 1,584,539 | 5/1926 | Hopkins | 240—10.69 |
| 1,768,667 | 7/1930 | Coulter | 240—44.2 |
| 1,803,433 | 5/1931 | Martinek | 240—44.2 |
| 2,710,948 | 6/1955 | Lawson | 240—1.3 XR |

NORTON ANSHER, *Primary Examiner.*

J. F. PETERS, *Assistant Examiner.*